(No Model.)

S. F. ALBERGER.
MECHANICAL MOVEMENT.

No. 520,626. Patented May 29, 1894.

Witnesses:
O. E. Hoddick
F. P. Kirsten

Inventor
Samuel F. Alberger
By W. F. Miller
Attorney

UNITED STATES PATENT OFFICE.

SAMUEL F. ALBERGER, OF ORCHARD PARK, ASSIGNOR, BY DIRECT AND MESNE ASSIGNMENTS, TO JAMES T. McCREADY, OF BUFFALO, AND HATTIE L. ALBERGER, OF ORCHARD PARK, NEW YORK.

MECHANICAL MOVEMENT.

SPECIFICATION forming part of Letters Patent No. 520,626, dated May 29, 1894.

Application filed February 14, 1894. Serial No. 500,144. (No model.)

*To all whom it may concern:*

Be it known that I, SAMUEL F. ALBERGER, a citizen of the United States, residing at Orchard Park, in the county of Erie and State of New York, have invented certain new and useful Improvements in Mechanical Movements; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in that class of mechanical movements in which friction wheels and disks enter as elements thereof, and has particular reference to mechanical movements of this general class in which an increase of speed is effected by shifting the frictional contact of the wheel with the disk, from the center of the disk outwardly toward its circumference and where for diminishing speed a retrograde movement is employed. As the speed is increased in the above manner the power correspondingly diminishes and vice-versa.

The object of my invention is to effect by improved means a reversal of the above conditions, that is to say, with my improved arrangement and operation of parts the speed is decreased as the friction-wheel is shifted toward the circumference of the friction disk and the power correspondingly increased, being greatest at the circumference, which is extremely desirable and often necessary where my improved mechanical movement is applied to vehicles carrying heavy loads, or heavily loaded machinery, where great power is required to start and slow speed is desirable. As the friction wheel is shifted toward the center of the friction disk, the power is correspondingly decreased and as the friction wheel crosses the center of the disk the motion is reversed.

To that end my invention consists of the combination of a driving-shaft, a driven shaft at right angles to said driving-shaft, a friction-disk on the end of said driven shaft a way, and an intermediate friction-wheel adjustable along said way and adapted to bear in any of the positions to which it may be adjusted on the way, circumferentially against the cylindrical face of the driving-shaft and the flat face of the friction-disk.

I will now proceed to minutely describe the manner in which I have carried out my invention and then claim what I believe to be novel.

Figure 1:
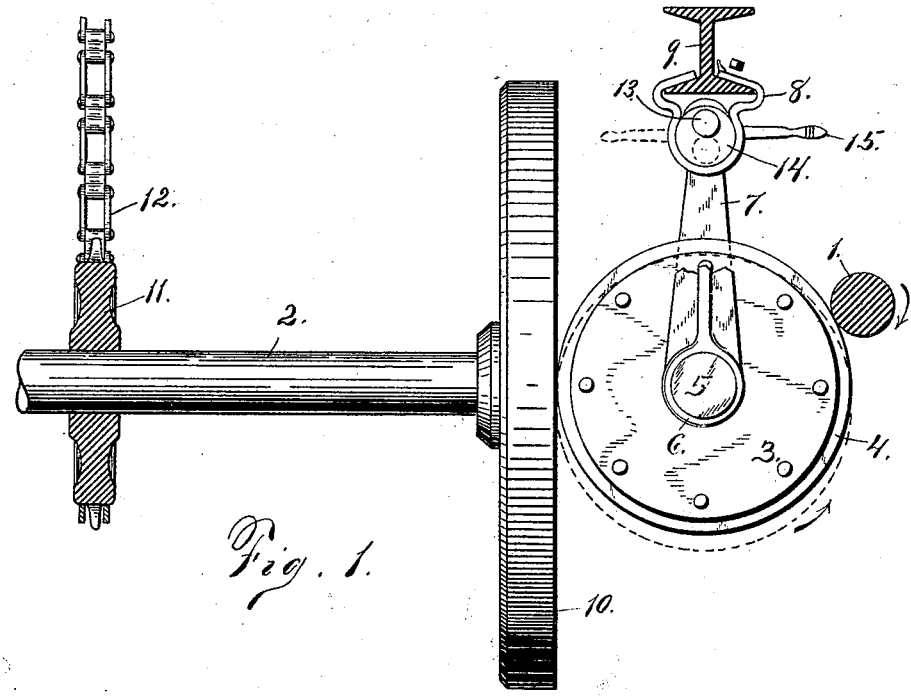
Figure 2:
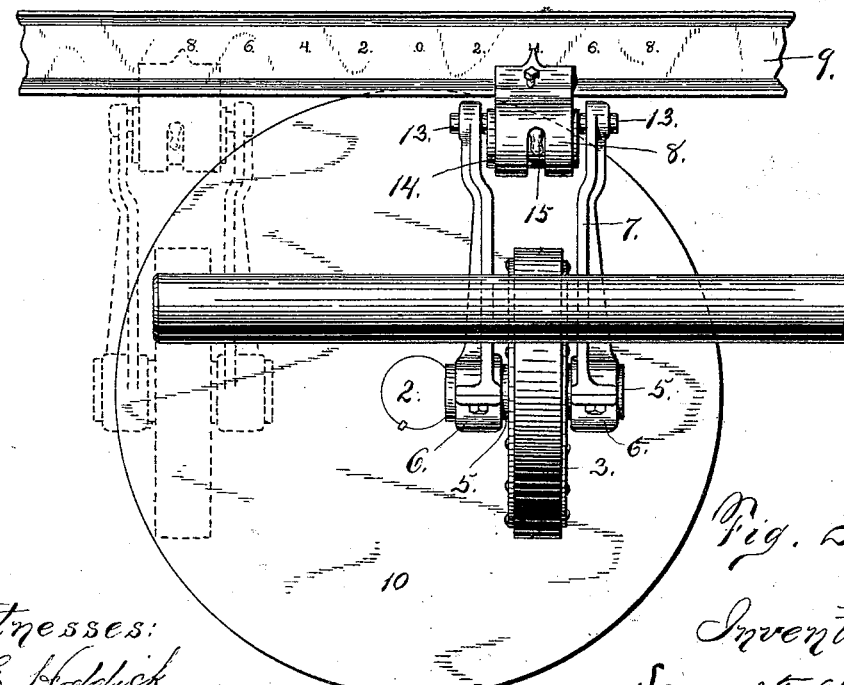

In the drawings—Figure 1 is a side elevation, and Fig. 2 a front elevation of my improved mechanical movement.

Referring to the drawings, 1 is the shaft connected with and revolved by the motor which may be of any well known type and 2 is the shaft at right angles to shaft 1 and to which the motion of shaft 1 is communicated. The shaft 2 is connected in any well known manner to the vehicle axle or machine intended to be operated thereby.

3 is a friction wheel having a leather or paper periphery 4 for frictional contact with the shaft 1. This friction wheel may be either loosely or rigidly mounted upon a shaft 5 which is journaled in the bearings 6. 6. of the hanger 7. This hanger 7 is carried by a slide 8, which is adjustable upon the way 9 in either direction and parallel to the shaft 1. A friction disk 10 is rigidly mounted upon the shaft 2 which as has been already stated, is at right angles to shaft 1. This disk is so arranged as to receive frictional contact from the friction-wheel 3 and 11 is a sprocket-wheel rigidly mounted upon the shaft 2 and connecting by sprocket chain 12 to the machine to be operated. For throwing the friction wheel 3 out of contact with shaft 1 and friction disk 10 I have provided the shaft 13 upon which is mounted the cam 14 which turns in the hanger 7. A lever 15 secured to the cam 14 is employed in turning the cam to raise or lower the friction-wheel into or out of contact with shaft 1 and friction disk 10. Any other well known device could be employed for effecting the same purpose. Upon the way 9 are arranged the numerals increasing in both directions from zero which is in vertical line with the center of shaft 2. A pointer 16 centrally arranged upon the top edge of the slide 8 is to be adjusted as the slide is moved, with reference to the numerals which indicate the increase or decrease of speed as the contact of the friction-wheel is shifted upon the surface of the friction-disk.

In operation the friction-wheel 3 is thrown in contact with the shaft 1 and friction disk 10 by means of the lever 15 as already described. The motion of the revolving shaft 1 connected to the motor is communicated to the friction-wheel 3 in contact therewith. This causes the wheel 3 to revolve and its motion is imparted to the friction-disk 10 which in turn imparts its rotary motion to the shaft 2 upon which it is mounted. The power thus imparted from shaft 1 to the shaft 2 at right angles thereto, by means of the interposed friction wheel and disk, is to be utilized as desired in propelling vehicles or operating machinery of any description.

It will be seen that with my improved arrangement of parts, the speed of revolution of the disk 10 decreases as the friction wheel moves toward its circumference and with a corresponding increase of power. An increase of speed and corresponding decrease of power is effected by shifting the contact from the circumference to the center of friction disk 10 and a reversal of motion of the friction-disk 10 is effected as the friction-wheel 3 passes the center of the disk 10 in either direction.

I claim—

In mechanism for transmitting motion, the combination of a driving-shaft, a driven shaft at right angles to said driving-shaft, a friction-disk at the end of said driven shaft, a way, and an intermediate friction-wheel adjustable along said way and adapted to bear in any of the positions to which it may be adjusted on the way, circumferentially against the cylindrical face of the driving-shaft and the flat face of the friction-disk, substantially as described.

In testimony whereof I have signed my name to this specification in the presence of two subscribing witnesses.

SAMUEL F. ALBERGER.

Witnesses:
JAMES T. McCREADY,
W. T. MILLER.